Aug. 4, 1964     E. D. HOWELL     3,143,241

NON-STICK SKILLET

Filed April 7, 1964

INVENTOR
Edwin D. Howell
BY
*Pennie, Edmonds, Morton, Taylor & Adams*
ATTORNEYS

United States Patent Office 3,143,241
Patented Aug. 4, 1964

3,143,241
NON-STICK SKILLET
Edwin D. Howell, Rome, N.Y., assignor to Revere Copper and Brass Incorporated, Rome, N.Y., a corporation of Maryland
Filed Apr. 7, 1964, Ser. No. 357,972
7 Claims. (Cl. 220—64)

This invention relates to cooking utensils, and in particular to utensils having a coating of a non-stick material on the inner surface thereof.

The development of frying pans and other cooking utensils having a coating of a non-stick plastic material on the inner food-contacting surface thereof has met with wide popular acceptance. The coating materials most commonly employed are tetrafluoroethylene and similar fluorocarbon resins, and these materials usually and most successfully have been applied to utensils made of aluminum and aluminum alloys. Attempts made heretofore to apply these non-stick materials to other metals from which cooking utensils are ordinarily fabricated, and in particular utensils formed of stainless steel, have not met with much success.

Cooking utensils formed from stainless steel have many important advantages over utensils formed of other metals—notably the freedom of stainless utensils from staining and discoloration and the relative ease with which they may be cleaned. However, stainless steel is a poor conductor of heat, and this can be a serious disadvantage especially when used for skillets and other utensils exposed to concentrated high temperatures. Moreover, as previously noted, coatings of non-stick materials cannot readily be applied to the surface of stainless steel utensils.

I have now developed a new cooking utensil construction which retains the essential advantages of stainless steel—namely, its cleanliness and freedom from discoloration—and at the same time overcomes or counteracts the poor heat conductivity of stainless steel and permits the ready application of a non-stick coating to the inside surface thereof. My new utensil is provided with a tri-component composite wall structure the outermost component of which is a layer of stainless steel, the intermediate component of which is a layer of aluminum advantageously metallurgically bonded to the inner surface of the layer of stainless steel, and the innermost component of which is a coating of a non-stick plastic material such as tetrafluoroethylene adhesively bonded to the inner surface of the layer of aluminum.

Figure 1:
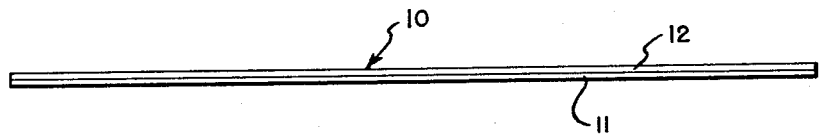
Figure 2:
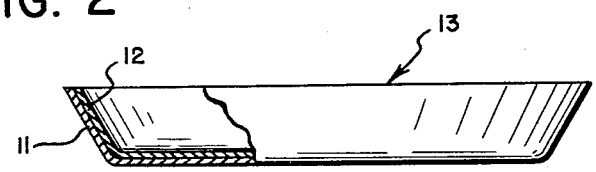
Figure 3:
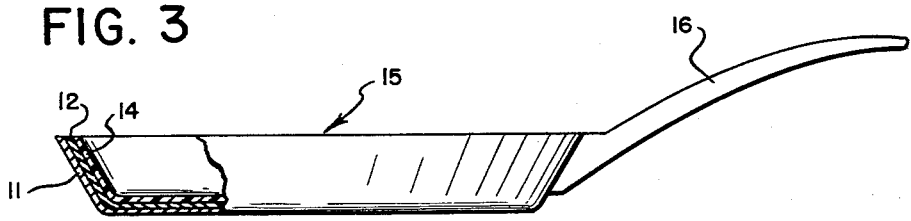
Figure 4:
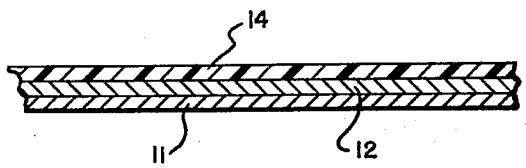

The composite structure of my non-stick stainless steel cooking utensil, and the preferred method of its manufacture, will be better understood from the following description thereof in conjunction with the accompanying drawings of which FIG. 1 is a side elevation of a bi-metallic blank from which the utensil is initially formed, FIG. 2 is a side elevation partly in section of the utensil after the initial forming operation, FIG. 3 is a side elevation partly in section of the utensil with the non-stick inner lining applied thereto, and FIG. 4 is an enlarged fragmentary sectional view showing the tri-component composite structure of my new cooking utensil.

In the preferred method of making my non-stick cooking utensil, a flat bi-metallic blank 10 is prepared by bonding a layer 11 of stainless steel to an adjoining layer 12 of aluminum, the shape or contour of the blank corresponding to the shape (i.e., circular, oval or rectangular) of the utensil to be formed therefrom. The layer of aluminum is preferably metallurgically bonded to the layer of stainless steel, advantageously by first rolling the two metal layers of the blank together to obtain what is essentially a mechanical or adhesive bond followed by treatment of the blank to develop a metallurgical bond between the metal layers.

The flat bi-metallic blank is shaped or formed to obtain the desired bowl- or pan-shaped utensil, for example, the frying pan or skillet 13 shown in FIG. 2, preferably by a drawing operation carried out with conventional deep drawing equipment. A coating 14 of a non-stick plastic material such as tetrafluoroethylene or a similar fluorocarbon resin is then applied to the inner surface of the aluminum layer 12 in the manner well known in the art to obtain the tri-component composite structure 15 shown in FIG. 3. A handle 16 completes the utensil.

As shown best in FIG. 4, the tri-component composite wall structure of my new utensil comprises an outer layer 11 of stainless steel, an intermediate layer 12 of aluminum bonded to the inner surface of the layer 11, and an inner coating 14 of a non-stick plastic material bonded to the inner surface of the layer 12. The bond between the stainless steel layer 11 and the aluminum layer 12 is advantageously metallurgical in character, and the bond between the aluminum layer 12 and the non-stick coating 14 is essentially mechanical or adhesive in character, the latter bond being obtained by spray-coating and fusing a layer of the non-stick material onto the prepared surface of the aluminum layer.

The composite cooking utensil of my invention presents the appearance of being simply a stainless steel vessel having a non-stick plastic coating on the food-contacting surface thereof, and my utensil possesses all of the many advantages of such a combination. However, the presence of an intermediate layer of aluminum between the outer layer of stainless steel and the inner layer of non-stick plastic results in a significant improvement both in the adherence of the non-stick coating to the underlying metal and in the heat conductivity of the utensil walls with the resulting elimination of localized hot spots when the utensil is in use.

From the foregoing description of my new cooking utensil having a unique tri-component composite wall structure it will be seen that I have made an important contribution to the art to which my invention relates.

I claim:

1. A stainless steel cooking utensil having a layer of non-stick plastic material on the inner food-contacting surface thereof, said cooking utensil having a tri-component composite wall structure comprising an outer layer of stainless steel, an intermediate layer of aluminum bonded to the inner surface of said outer layer, and an inner layer of a non-stick plastic material bonded to the inner surface of said intermediate layer.

2. A stainless steel cooking utensil having a layer of non-stick plastic material on the inner food-contacting surface thereof, said cooking utensil being characterized by good thermal conductivity and by firm adhesion of the non-stick material to the underlying metal, the walls of said utensil comprising an outer layer of stainless steel, an intermediate layer of aluminum metallurgically bonded to the inner surface of said outer layer, and an inner coating of a non-stick fluorocarbon resin adhesively bonded to the inner surface of said intermediate layer.

3. The cooking utensil according to claim 2 in which the fluorocarbon resin is tetrafluoroethylene.

4. A non-stick cooking utensil having a tri-component composite wall structure the outermost component of which is a layer of stainless steel, the intermediate component of which is a layer of aluminum bonded to the inner surface of said outermost component, and the innermost component of which is a coating of non-stick plastic material bonded to the inner surface of said intermediate component.

5. The cooking utensil according to claim 4 in which the layer of aluminum is metallurgically bonded to the layer of stainless steel and in which the coating of non-stick plastic material is adhesively bonded to the layer of aluminum.

6. The cooking utensil according to claim 4 in which the non-stick plastic material is a fluorocarbon resin.

7. The cooking utensil according to claim 4 in which the non-stick plastic material is tetrafluoroethylene.

No references cited.